(12) United States Patent
Zub

(10) Patent No.: US 8,245,729 B2
(45) Date of Patent: Aug. 21, 2012

(54) EXHAUST VENTING FOR A FLUID CONTROL DEVICE

(75) Inventor: Walter A Zub, Lone Tree, CO (US)

(73) Assignee: Norgren, Inc., Littleton, CO (US)

( * ) Notice: Subject to any disclaimer, the term of this patent is extended or adjusted under 35 U.S.C. 154(b) by 609 days.

(21) Appl. No.: 12/445,318

(22) PCT Filed: Oct. 23, 2006

(86) PCT No.: PCT/US2006/041294
§ 371 (c)(1),
(2), (4) Date: Apr. 13, 2009

(87) PCT Pub. No.: WO2008/051212
PCT Pub. Date: May 2, 2008

(65) Prior Publication Data
US 2010/0032595 A1 Feb. 11, 2010

(51) Int. Cl.
*F16K 11/07* (2006.01)
(52) U.S. Cl. .............. 137/625.66; 137/625.69
(58) Field of Classification Search .............. 137/106, 137/107, 625.34, 625.6, 625.66, 625.69, 137/102
See application file for complete search history.

(56) References Cited

U.S. PATENT DOCUMENTS

| | | | | |
|---|---|---|---|---|
| 3,405,727 A * | 10/1968 | Hill | | 137/83 |
| 3,406,701 A * | 10/1968 | Meulendyk | | 137/83 |
| 3,407,834 A * | 10/1968 | Brandenberg | | 137/271 |
| 3,707,163 A * | 12/1972 | Hugler | | 137/271 |
| 4,046,165 A * | 9/1977 | Rose et al. | | 137/624.27 |
| 4,067,357 A * | 1/1978 | Ruchser | | 137/596.16 |
| 4,319,609 A * | 3/1982 | Debrus | | 137/625.63 |
| 4,335,750 A | 6/1982 | Bauer et al. | | |
| 4,463,819 A * | 8/1984 | Becker et al. | | 180/441 |
| 4,491,155 A | 1/1985 | Meyer et al. | | |
| 4,637,474 A * | 1/1987 | Leonard | | 172/7 |
| 4,674,526 A * | 6/1987 | Athanassiu | | 137/113 |
| 5,971,022 A * | 10/1999 | Hayashi et al. | | 137/625.69 |
| 5,992,460 A * | 11/1999 | Akimoto | | 137/625.64 |
| 6,427,720 B1 * | 8/2002 | Hayashi et al. | | 137/554 |
| 7,637,281 B2 * | 12/2009 | Rapke et al. | | 137/625.64 |
| 2003/0047222 A1 * | 3/2003 | Neff et al. | | 137/625.64 |
| 2003/0221730 A1 * | 12/2003 | Porter | | 137/625.64 |
| 2009/0249776 A1 * | 10/2009 | Davidson | | 60/459 |
| 2010/0224060 A1 * | 9/2010 | Nemenoff et al. | | 91/436 |

FOREIGN PATENT DOCUMENTS

| | | |
|---|---|---|
| DE | 1234115 B | 2/1967 |
| DE | 3043871 A1 | 7/1982 |
| GB | 1300677 A | 12/1972 |
| GB | 2111649 A | 7/1983 |

* cited by examiner

*Primary Examiner* — Craig Schneider
*Assistant Examiner* — Matthew W Jellett
(74) *Attorney, Agent, or Firm* — The Ollila Law Group LLC

(57) ABSTRACT

A fluid control device is disclosed that is configured to vent pilot volume through an exhaust port or exhaust passageway (140) integrated into the fluid control device. The fluid control device has a fluidic switch (112) configured to switch a pilot volume into the exhaust port or exhaust passageway (140) when a signal port or signal passageway (114) is de-pressurized. The fluidic switch (112) couples the signal port or signal passageway (114) to the pilot volume when the signal port or signal passageway (114) is pressurized.

10 Claims, 2 Drawing Sheets

US 8,245,729 B2

EXHAUST VENTING FOR A FLUID CONTROL DEVICE

BACKGROUND OF THE INVENTION

Fluid control devices typically are activated using a pressurized fluid passed through a signal port or passageway. The fluid may be pneumatic, hydraulic, or any other type of liquid or gas. The pressurized fluid may be introduced into the signal port or passageway using an activating device, for example a solenoid, attached to the fluid control device. The pressurized fluid causes a movable part inside the fluid control device to shift from a non-activated position to an activated position. When the pressurized fluid is removed, the movable part shifts back to the non-active position. The fluid trapped in the volume between the activated and non-activated positions must be vented for the movable part to return to the non-activated position. Typically the fluid is vented or exhausted out through the signal port or passageway to the solenoid. The exhaust flows through the solenoid and out through an exhaust passageway in the solenoid. Some solenoids may have small exhaust passageways that limit the flow of the exhaust fluid through the solenoid and create back pressure in the fluid control device. The back pressure may create seal wear and limit the speed of the fluid control device.

SUMMARY OF THE INVENTION

A fluid control device is disclosed that is configured to vent pilot volume through an exhaust port or passageway integrated into the fluid control device. The fluid control device has a fluidic switch configured to switch a pilot volume into the exhaust port or passageway when a signal port or passageway is de-pressurized. The fluidic switch couples the signal port or passageway to the pilot volume when the port or signal passageway is pressurized.

ASPECTS

One aspect of the invention includes, a fluid control device, comprising:
a body having a first cavity;
a movable part having a first end located inside the first cavity where the first end is located at a first position inside the first cavity when the movable part is at an activated position and where the first end is positioned inside the first cavity at a second position when the movable part is at a non-activated position and where the first end displaces a first volume between the first position and the second position;
a first passageway coupled to the first cavity where the first passageway is coupled to a first fluidic switch;
a first signal port coupled to the first fluidic switch and a first exhaust passageway coupled to the first fluidic switch where the first fluidic switch is configured to couple the first passageway with the first signal port when the first signal port is pressurized and where the first fluidic switch is configured to couple the first passageway with the first exhaust passageway when the first signal port is not pressurized thereby exhausting the first volume through the first exhaust passageway.
Preferably, where the movable part is a spool and the fluid control device is a spool valve.
Preferably, where the movable part is a piston and the fluid control device is a spool valve.
Preferably, where fluidic switch is selected from one of the following: a poppet valve, a flapper valve, a ball shuttle valve.

Preferably, where the first end forms a fluid tight seal with the first cavity.
Preferably, at least one seal configured to form a fluid tight seal between the movable part and the body.
Preferably, the fluid control device further comprising:
a second cavity in the body;
a second end of the movable part, opposite the first end, and located inside the second cavity where the second end is located at a first position inside the second cavity when the movable part is at the activated position and where the second end is positioned inside the second cavity at a second position when the movable part is at the non-activated position and where the second end displaces a second volume between the first position and the second position;
a second passageway coupled to the second cavity where the second passageway is coupled to a second fluidic switch;
a second signal port coupled to the second fluidic switch and a second exhaust passageway coupled to the second fluidic switch where the second fluidic switch is configured to couple the second passageway with the second signal port when the second signal port is pressurized and where the second fluidic switch is configured to couple the second passageway with the second exhaust passageway when the second signal port is not pressurized thereby exhausting the second volume through the second exhaust passageway.

Another aspect of the invention comprises a method for operating a fluid control device, comprising:
displacing a part in a first direction by pressing against a first end of the part with a pressurized fluid where the pressurized fluid fills a first volume as the part displaces, where the pressurized fluid is introduced into the first volume through a first fluidic switch that couples a first signal port to the first volume when the first signal port is pressurized;
displacing the part in a second direction, opposite the first direction, and venting the fluid in the first volume through a first exhaust passageway by coupling the first volume to the first exhaust passageway with the first fluidic switch where the first fluidic switch is located internally to the fluid control device.
Preferably, the method further comprises where the fluid control device is a spool valve.
Preferably, the method further comprises venting a fluid in a second volume, as the part is displaced in the first direction, through a second exhaust passageway by coupling the second volume to the second exhaust passageway with a second fluidic switch where the second fluidic switch is located internally to the fluid control device.

DESCRIPTION OF THE DRAWINGS

It should be understood that the drawings are not necessarily to scale.

DETAILED DESCRIPTION OF THE INVENTION

Figure 1:
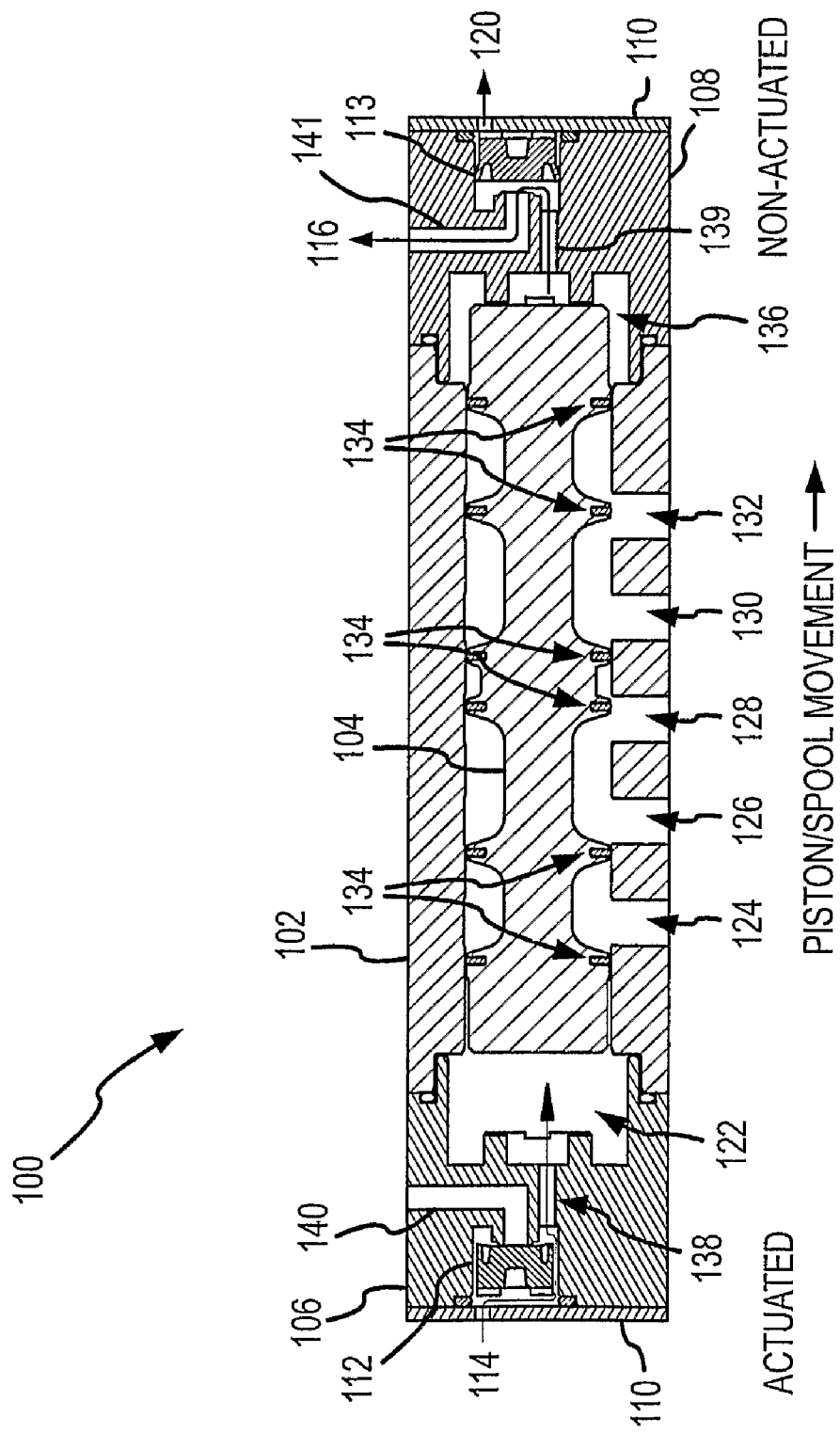
FIG. 1 is a sectional view of a spool valve 100 in an example embodiment of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below for the various examples can be combined in various ways to form multiple variations of the invention. As a result, the invention is not limited to the specific examples described below, but only by the claims and their equivalents.

FIG. 1 is a sectional view of a spool valve 100 in an example embodiment of the invention. Spool valve 100 comprises body 102, spool 104, left end 106, right end 108, two end plates 110, a first fluidic switch 112, a second fluidic switch 113 and seals 134. Spool 104 is installed into a cavity formed in body 102. Left and right ends (106 and 108) attach to the left and right side of body 102 respectively, capturing spool 104 between the two ends. A number of openings (124, 126, 128, 130 and 132) are formed in the bottom of body 102. In other embodiments openings (124, 126, 128, 130 and 132) may be formed in either side, or a combination of sides and bottom, of body 102. Spool 104 is configured to have two positions inside body 102, a left position and a right position. Spool 104 is shown in the right position. In the right position, spool 104 couples opening 126 to opening 128, and couples opening 130 to opening 132. In the left position, spool couples opening 124 to opening 126, and opening 128 to opening 130. In other embodiments, spool 104 may couple other openings together in the two positions. Spool 104 is moved between the two positions by fluidic pressure pushing against one or the other end of spool 104. The fluid may be air, water, hydraulic fluid or any other gas or liquid. In some example embodiment of the invention, a piston may be positioned at each end of the spool to help generate the force that moves the spool between positions. Seals 134 may be attached to spool 104 to help form fluid tight seals between spool 104 and body 102. Fluidic switch 112 is installed into left end 106 and fluidic switch 113 is installed into the right end 108. End plates 110 are attached to the left and right ends (106 and 108) and capture the fluidic switches (112 and 113) inside the left and right ends (106 and 108). A signal port or channel may be formed in each end plate 110, and/or in end plate 106 and 108, and allows a signal fluid to be applied to either end of spool valve 100.

In operation, a fluid is directed into the fluid signal port 114. Fluidic switch 112 seals against exhaust passageway 140 and allows fluid to pass into signal passageway 138. The fluid exits the signal passageway 138 and enters chamber or cavity 122 and pushes against the left side of spool 104, forcing spool 104 to move into the right position. As spool 104 moves to the right, fluid trapped in chamber or cavity 136 at the right end of spool 104 is forced from chamber or cavity 136. The fluid exiting chamber or cavity 136 causes fluidic switch 113 to seal signal port 120 and direct the exhaust fluid 116 to exit through exhaust passageway 141. In prior art fluid control devices, the exhaust fluid forced from chamber or cavity 136 would be vented through signal port 120. Typically a solenoid valve would be coupled to signal port 120 and used to provide the pressurized fluid to the signal port 120. The solenoid valve may be sized such that the passage of the exhaust fluid through the solenoid valve may be constricted. The restricted flow of the exhaust fluid may create back pressure against seals 134 on spool 104 and/or may slow the operation of spool valve 100.

By switching the exhaust fluid into exhaust passageway 141 formed in spool valve 100, the restriction of passing the exhaust fluid through the solenoid valve can be eliminated. This may increase the operational speed of spool valve 100 and/or may increase the life of seals 134. Because the exhaust passageway 141 is part of spool valve 100, the size of the exhaust passageway 141 can be optimized for the chamber size 136 and spool 104 movement. This may make the performance of the spool valve 100 independent of the type or size of the solenoid valve coupled to the spool valve. This invention is not limited to spool valves, but may include any type of fluid control device that requires venting of exhaust fluid through a signal port, for example poppet valves and cylinders.

Figure 2A:
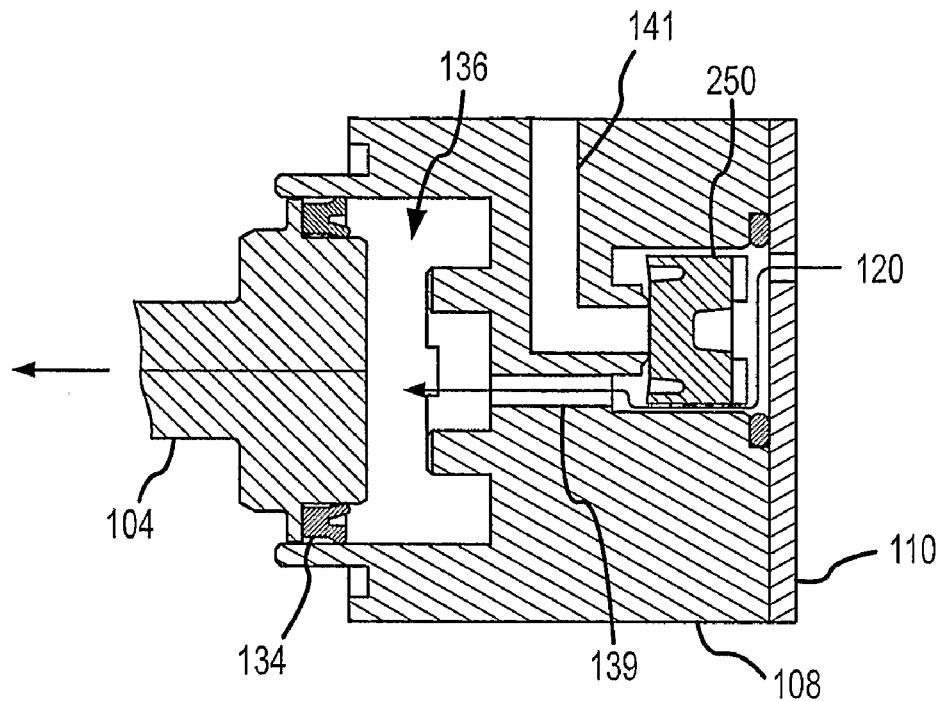
FIG. 2a is a cross sectional view of one end of spool valve 100 in an activated position in an example embodiment of the invention.
Figure 2B:
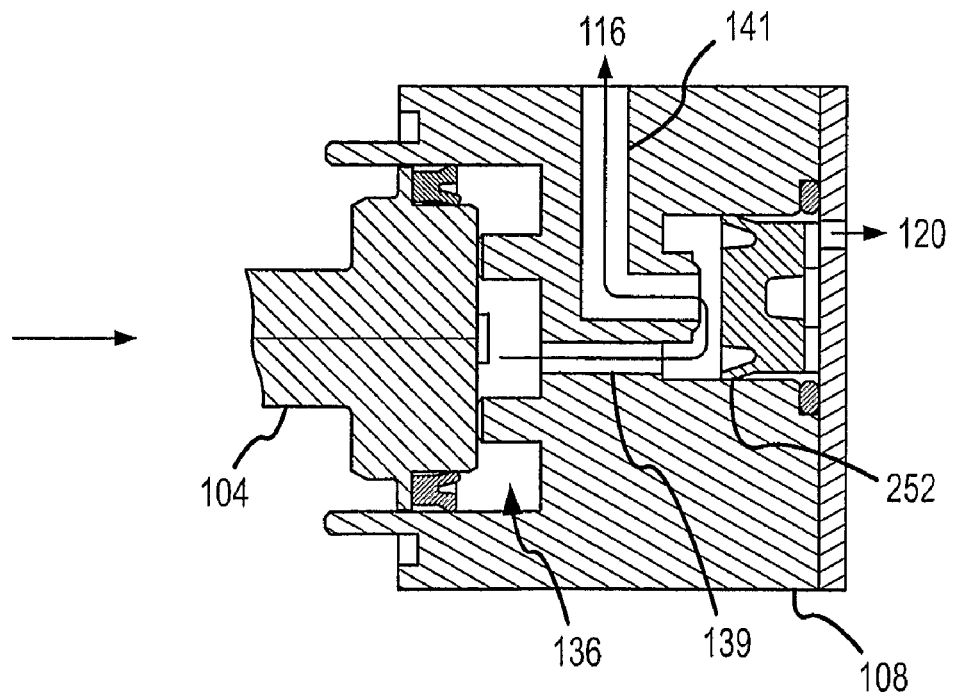
FIG. 2b is a cross sectional view of one end of spool valve 100 in an un-activated position in an example embodiment of the invention

FIG. 2 is a cross sectional view of one end of spool valve 100 in an example embodiment of the invention. FIG. 2 shows the fluid switch 113 in the end of spool valve 100 implemented as a poppet valve in an example embodiment of the invention. FIG. 2a shows the poppet valve in the activated position and FIG. 2b shows the poppet valve in the un-activated position.

In the activated position, fluid is introduced into signal port 120. The fluid forces poppet seal 250 to seal against exhaust passageway 141. A flexible membrane 252 allows the fluid to pass around poppet seal 250 and enter signal passageway 139. The fluid exits from the signal passageway 139 into chamber or cavity 136 and presses against the right side of spool 104, moving spool 104 to the left. In the un-activated position, pressure is removed from signal port 120. Spool 104 moves to the right, forcing the fluid in chamber or cavity 136 into signal passageway 139. Flexible membrane 252 seals against right end 108, forcing poppet seal 250 to move away from exhaust passageway 141, and seal against signal port 120. Exhaust fluid exits signal passageway 139 and is exhausted through exhaust passageway 141.

The example embodiments shown above use a poppet valve for the fluidic switches on each side of the spool valve, however other fluidic switches may be used in other example embodiments. Some examples of other types of fluid switches that may be used include a ball trapped in a passageway that moves between two positions (sometimes called a ball shuttle valve), a flapper type fluid valve, or the like.

What is claimed is:
1. A fluid control device, comprising:
a body including a first cavity (136), a first body end (106), and a second body end (108);
a movable part (104) having a first end located inside the first cavity (136) where the first end is located at a first position inside the first cavity (136) when the movable part (104) is at an activated position and where the first end is positioned inside the first cavity (136) at a second position when the movable part (104) is at a non-activated position and where the first end displaces a first volume between the first position and the second position;
a first passageway (139) in fluid communication with the first cavity;
a pressure controlled first fluidic switch (113) located internally to the first body end and in fluid communication with the first passageway (139);
a first signal port (120) formed in the body and coupled to the first fluidic switch (113) and a first exhaust passageway (141) formed in the body and coupled to the first fluidic switch (113) where the first fluidic switch is configured to fluidly couple the first passageway (139) with the first signal port (120) when the first signal port (120) is pressurized and where the first fluidic switch (113) is configured to fluidly couple the first passageway (139) with the first exhaust passageway (141) when the first signal port (120) is not pressurized thereby exhausting the first volume through the first exhaust passageway (141).

2. The fluid control device of claim 1, where the movable part (104) is a spool and the fluid control device is a spool valve.

3. The fluid control device of claim 1, where the movable part (104) is a piston and the fluid control device is a spool valve.

4. The fluid control device of claim 1, where the fluidic switch (113) is selected from one of the following: a poppet valve, a flapper valve, a ball shuttle valve.

5. The fluid control device of claim 1 where the first end forms a fluid tight seal with the first cavity (136).

6. The fluid control device of claim 1, further comprising: at least one seal (134) configured to form a fluid tight seal between the movable part (104) and the body.

7. The fluid control device of claim 1, further comprising: a second cavity (122) in the body;
a second end of the movable part (104), opposite the first end, and located inside the second cavity (122) where the second end is located at a first position inside the second cavity (122) when the movable part (104) is at the activated position and where the second end is positioned inside the second cavity (122) at a second position when the movable part (104) is at the non-activated position and where the second end displaces a second volume between the first position and the second position;
a second passageway (138) in fluid communication with the second cavity (122);
a second fluidic switch (112) in fluid communication with the second passageway (138) and movable independent of the movable part (104); and
a second signal port (114) coupled to the second fluidic switch (112) and a second exhaust passageway (140) coupled to the second fluidic switch (112) where the second fluidic switch (112) is configured to fluidly couple the second passageway (138) with the second signal port (114) when the second signal port (114) is pressurized and where the second fluidic switch (112) is configured to fluidly couple the second passageway (138) with the second exhaust passageway (140) when the second signal port (114) is not pressurized thereby exhausting the second volume through the second exhaust passageway (140).

8. A method for operating a fluid control device with a body having a first body end and a second body end, comprising:
displacing a part in a first direction by acting against a first end of the part with a pressurized fluid where the pressurized fluid fills a first volume (122) as the part displaces, where the pressurized fluid is introduced into the first volume (122) through a first fluidic switch (112) that moves to fluidly couple a first signal port (114) formed in the body to the first volume (122) when the first signal port (112) is pressurized;
displacing the part in a second direction, opposite the first direction, and venting the fluid in the first volume (122) through a first exhaust passageway (140) formed in the body by moving the first fluidic switch (112) to fluidly couple the first volume (122) to the first exhaust passageway (140) with the first fluidic switch (112) where the first fluidic switch (112) is located internally to the first body end.

9. The method for operating a fluid control device of claim 8 where the fluid control device is a spool valve.

10. The method for operating a fluid control device of claim 8, further comprising:
venting a fluid in a second volume, as the part is displaced in the first direction, through a second exhaust passageway by moving a second fluidic switch to fluidly couple the second volume to the second exhaust passageway where the second fluidic switch is located internally to the fluid control device.

* * * * *